C. P. SALGEE.
ANTISKID TIRE.
APPLICATION FILED DEC. 18, 1920.

1,381,749.

Patented June 14, 1921.

Charles P. Salgee
INVENTOR

BY Victor J. Evans
ATTORNEY

WITNESS:

UNITED STATES PATENT OFFICE.

CHARLES P. SALGEE, OF PHILADELPHIA, PENNSYLVANIA.

ANTISKID-TIRE.

1,381,749. Specification of Letters Patent. Patented June 14, 1921.

Application filed December 18, 1920. Serial No. 431,621.

*To all whom it may concern:*

Be it known that I, CHARLES P. SALGEE, a citizen of the United States, residing at Philadelphia, in the county of Philadelphia, and State of Pennsylvania, have invented new and useful Improvements in Antiskid-Tires, of which the following is a specification.

This invention relates to tires and it has more particular reference to that type or form of resilient tire for motor propelled vehicles which comprises an elastic tread having incorporated therein relatively inelastic inserts or plugs of non-slipping material, the primary object of my present invention being to provide an improved form of tire of the nature referred to which is characterized by radially disposed inserts of a material having a high co-efficient of friction, said inserts also being so arranged relative to the tire proper as in no way to impair the resiliency thereof.

Another object of this invention is to provide an anti-skid tire having a tire rim adapted for attachment on a wheel felly, said antiskid tire and tire rim being so anchored together as to effectively prevent any lateral or longitudinal displacement of either part relative to the other.

A further object of this invention is to provide an anti-skid tire which is so fashioned as to insure the maximum gripping effect or a firm hold at all times during its life upon the surface over which it travels and thereby eliminating skidding when said surface is wet or slippery.

A still further object of this invention is the provision of an anti-skid tire which insures the maximum tractive qualities without any adverse effects upon the surface over which it is traveled.

With the foregoing and other objects in view as will later on be more apparent my invention consists essentially of a metallic tire rim having on its outer surface a tire or tread of elastic material, said rim and tire being securely anchored together by radially disposed plugs formed from a material having a higher co-efficient of friction than that of the elastic tire or tread.

In the further disclosure of the invention reference is to be had to the accompanying sheet of explanatory drawings, constituting a part of this specification, and in which like characters of reference designate the same or corresponding parts in all the views.

Figure 1:
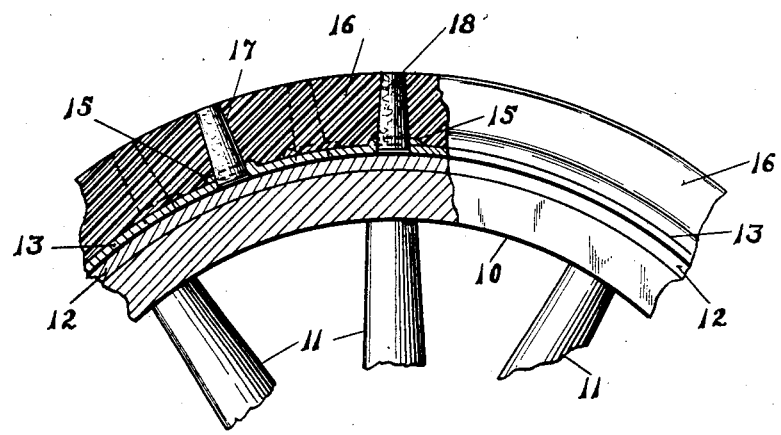

Figure 1— is a fragmentary portion of a wheel felly and spokes having my improved anti-skid tire applied thereto, part being broken away and in section for the sake of clearness.

Figure 2:
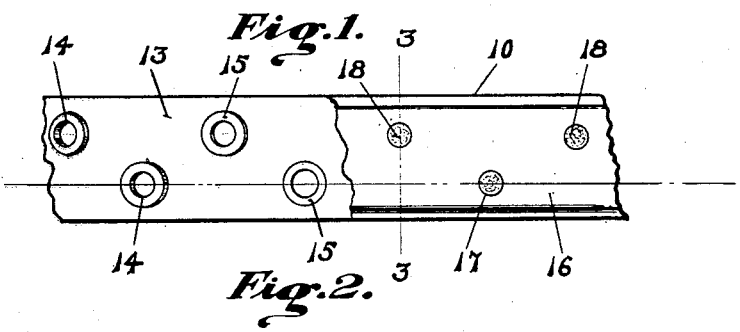

Fig. 2— is a plan of the same with a portion of the tire or tread removed to better disclose the outer peripheral appearance of the tire rim.

Figure 3:
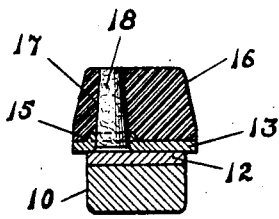

Fig. 3— is a section taken approximately on the line 3—3 in Fig. 2; and

Figure 4:
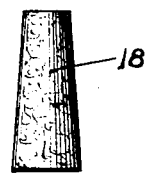

Fig. 4— is an enlarged detail elevation of one of the plugs hereinafter more particularly referred to.

Referring more particularly to the views the numeral 10 designates a fragmentary portion of a wheel felly, 11 the spokes and 12 the felly rim, all of said parts being according to the well known arrangements adopted in wheel construction and more particularly as prevailing in the production of wheels for heavy vehicles such as motor trucks and the like.

According to my present invention I construct an annular ring or tire rim 13 from sheet metal and of appropriate width and thickness and on the outer face thereof I form by punching, stamping or otherwise a series of staggered openings 14 in the nature of radially projecting cups constituted by the flanged protrusions 15, it being particularly noted that these openings are tapered or funnel shaped in cross-section for the purpose later on to be explained. Fitting tightly on to the tire rim 13 is the tire proper 16 of rubber or other elastic material, and said tire 16 is molded or otherwise fashioned with radially disposed passages or apertures 17 tapered in the cross section of the tire, that is to say they are slightly funnel shaped with the taper outwardly directed and the inner ends being suitably flared to seat snugly on the aforesaid flanged protrusions 15 of the tire rim 13. It is here to be particularly noted that the tire rim 13 is not provided with any side flanges or beads for holding the tire 16 in place but that said tire and rim are of substantially the same width, and this feature considerably decreases the weight of the structure without in the least degree adversely affecting its durability.

In order to properly anchor the tire 16 to the tire rim 13 I employ plugs 18 of a material having a higher co-efficient of friction than the tire 16, and said plugs are preferably cut from a rope-like length of woven cotton thread or the like and compressed to a sufficient degree to frictionally fit the registering openings 14 and passages 17. On an examination of the drawings it will be seen that these plugs 18 are shaped frusto-conical and they are of a length to completely bed in the openings 14 and passages 17 and thereby firmly lock the tire 16 to the tire rim 13 thereby preventing lateral as well as longitudinal displacement.

From the foregoing it will be clearly seen that by my invention I provide a resilient and anti-skid tire which presents on its tread or wearing surface a series of staggered inserts or plugs 18 of a higher co-efficient of friction than the rubber tire 16, said plugs, however, due to their manufacture not imparting any objectionable radial rigidity, whereas by their use they considerably enhance the life and tractive power of the tire. Furthermore, it is to be particularly noted that by anchoring the tire 16 and tire rim 13 together with the plugs 18 when the completed tire is in use said plugs will be always kept forced outwardly by the felly rim and due to their particular formation and manufacture will effectively prevent any tendency to side slippage or skidding when the wheel is traveling over wet or greasy surfaces. Still further it is to be remarked that with a tire constructed in the manner above set forth there will be a continuous tread surface of a composite nature always presented—namely, a rubber surface having inset zig-zag or staggered portions of a higher co-efficient of friction—and yet it will be one that will not be subject to any radial rigidity.

Finally it is to be understood that various slight changes might be made in the general form, cross section and arrangement of parts described without departing from my invention, for instance, the application of the invention to tires having two road faces or treads separated by an intervening groove will be obvious, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:—

1. A tire for vehicle wheels comprising an annular ring adapted for attachment on a wheel felly and having outwardly flanged openings therein, a resilient tire for fitment on said annular ring and having radial passages therethrough in register with the aforesaid flanged openings, and plugs of a material having a higher coefficient of friction fitted into said registering openings and passages whereby the annular ring and resilient tire are firmly anchored together.

2. A tire for vehicle wheels comprising an annular ring for attachment on a wheel felly and having outwardly flanged and staggered openings therein, a resilient tire for fitment on said annular ring and having radially disposed tapered passages in register with the aforesaid flanged openings, and correspondingly tapered plugs of a material having a higher coefficient of friction fitted into said registering openings and passages whereby the annular ring and resilient tire are firmly anchored together.

3. A tire for vehicle wheels comprising an annular ring for attachment on a wheel felly and having outwardly flanged and staggered openings therein, a rubber tire for fitment on said annular ring and having radially disposed frusto-conical passages in register with the aforesaid flanged openings, and frusto-conical plugs of compressed rope-like fabric having a higher coefficient of friction fitted into said registering openings and passages whereby the annular ring and rubber tire are firmly anchored together.

In testimony whereof I affix my signature.

CHARLES P. SALGEE.